Jan. 6, 1942.   C. W. NESSELL   2,269,036
SUMMER-WINTER AIR CONDITIONING CONTROL SYSTEM
Filed Sept. 24, 1938
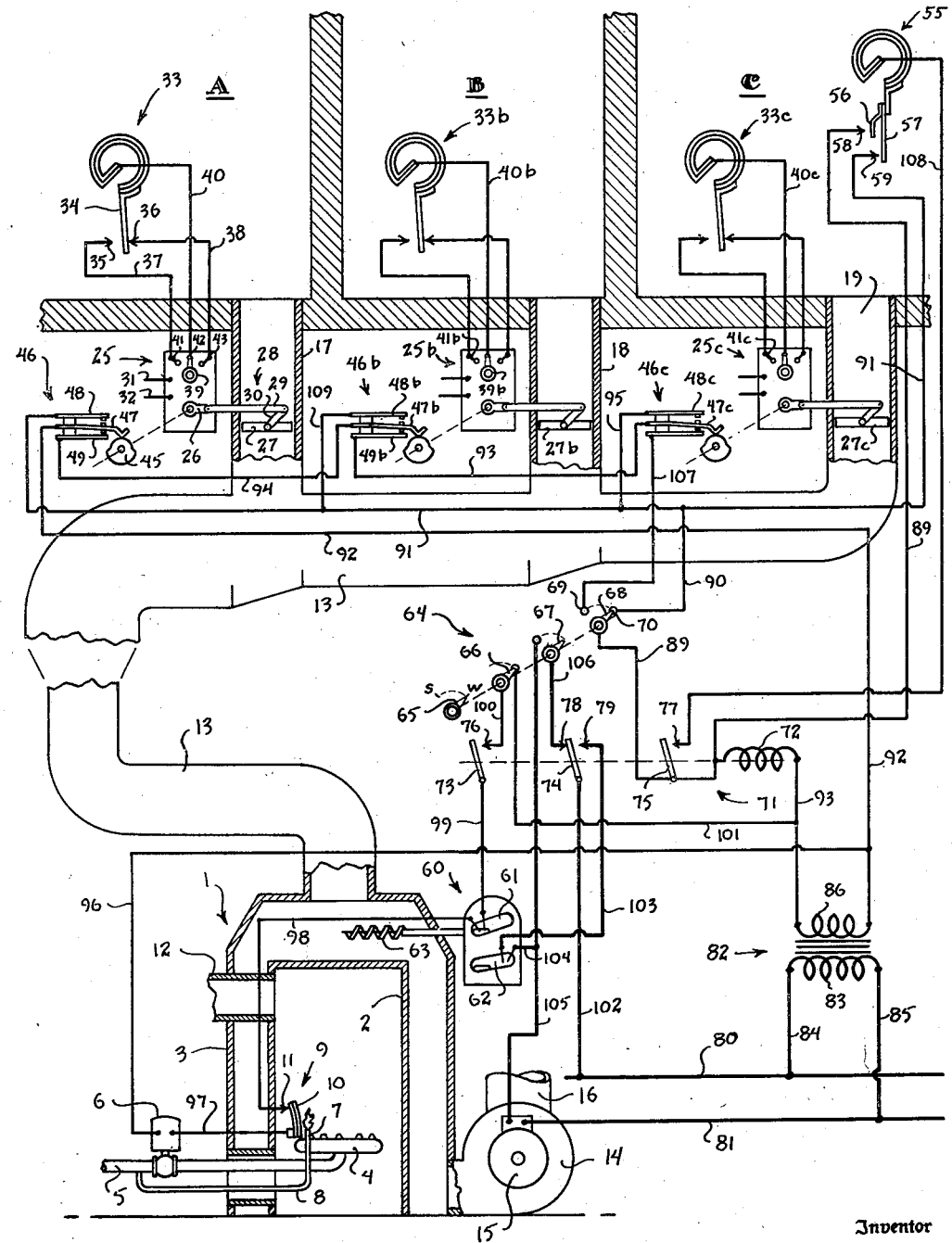
Inventor
Clarence W. Nessell
By
George H Fisher
Attorney Patented Jan. 6, 1942

2,269,036

UNITED STATES PATENT OFFICE 2,269,036

SUMMER-WINTER AIR CONDITIONING CONTROL SYSTEM

Clarence W. Nessell, Dayton, Ohio, assignor to Minneapolis-Honeywell Regulator Company, Minneapolis, Minn., a corporation of Delaware Application September 24, 1938, Serial No. 231,547

14 Claims. (Cl. 236—11)

My invention relates to control of air conditioning and is particularly directed to a simple and inexpensive control arrangement for changing over an all year zone type system for summer cooling operation. The improvement of my present invention has to do with air conditioning systems employing individual zone thermostats and dampers controlled thereby for regulating the supply of treated air circulated to the various zones by a fan or the like. The principal object of my invention is to provide a simple control arrangement for shifting control of the fan to a single thermostat for summer operation, the controls being so interrelated that at least one damper must be open either in the winter or summer to permit fan operation. By accomplishing this object in the particular manner in which I do I eliminate apparatus such as reversing switches and the like customarily used for converting the zone thermostats for summer operation and still the fan will not operate unless at least one damper is open in the summertime as well as in winter. In other words, the zone thermostats relinquish control over the fan during the summer and the fan may then be controlled in response to a separate thermostat but the latter thermostat may not start the fan if all dampers are closed.

Among other objects of my invention are:

The provision in a zone type air conditioning system having individual zone thermostats and dampers and auxiliary switches associated with the dampers for controlling a circulating fan, of a changeover control arrangement for shifting control of the fan to a separate thermostat for summer operation, the control arrangement being such that the auxiliary switches cooperate with the separate thermostat to prevent fan operation in the summertime unless at least one damper is open.

Another object is the provision in a zone type air conditioning system having individual zone thermostats and dampers controlled thereby for regulating the supply of air circulated to the various zones by a fan or the like, of a relay for controlling the fan and a summer-winter changeover control arrangement whereby the fan is started when the relay is energized in the wintertime, and the fan is started when the relay is deenergized in the summertime, the relay being controlled by a separate thermostat in summertime and being energizable through the said control arrangement whenever all the dampers are closed.

Further objects of my invention and various advantages and improved results thereof will become apparent as the specification proceeds, the invention residing in the improved combination, arrangement, and interrelation of parts and upon which I desire protection by Letters Patent of the United States.

The single figure of the drawing represents diagrammatically a zone type air conditioning system embodying the improved control arrangement of my invention therein.

Referring to the drawing I have shown diagrammatically a portion of a building having a warm air heating system of the zone type, the air distributing equipment of the system being of course also applicable for cooling purposes. The letters A, B, and C designate various zones of the building which may consist of individual rooms or groups of rooms and which may be served with conditioned air from a warm air furnace generally indicated by reference numeral 1. The warm air furnace 1 comprises a combustion chamber 2 housed within an air heating casing 3 or jacket which forms a bonnet for the furnace. Within the combustion chamber 2 may be disposed a gas burner 4 of conventional type to which fuel is supplied through a conduit 5 which may communicate with a gas main (not shown). Interposed in the conduit 5 is a gas control valve 6 which I have chosen for purposes of illustration to disclose as an electric solenoid type valve. Numeral 7 indicates a constantly burning pilot burner to which fuel is continuously fed through a tube 8 communicating with the conduit 5 as shown. Adjacent the flame of the pilot burner 7 is a safety pilot 9 comprising a bimetal blade 10 cooperating with a fixed electrical contact 11. The safety pilot 9 may be of conventional type, its function being to shut down the system in event of pilot flame failure as I will point out more explicitly later. The combustion chamber 2 has a flue or stack 12 connected thereto for carrying away the gases of combustion, and communicating with casing 3 is an air distributing duct 13 through which warm air is carried to the various spaces being served. Numeral 14 indicates a furnace fan driven by electric motor 15 and having a suction conduit 16 which may draw air from the various spaces being served and force it through the air heating casing 3 and through the duct 13 to the spaces. The duct 13 has branch conduits 17, 18, and 19 which lead to the zones A, B, and C, respectively. Disposed within each of the branch conduits 17, 18, and 19 is a damper operated by a thermostatically controlled electric motor, each motor being controlled by a thermostat located in its respective zone. I will describe in detail the equipment of zone A. Numeral 25 indicates a zone damper motor which has a crank arm 26 operably connected to the damper 27 by a linkage indicated at 28. The linkage 28 comprises a connecting rod 29 and a rocker arm 30, the connecting rod 29 being connected to the crank arm 26. The damper 27 is mounted upon a pivot and is shown in the closed position. By rotating the crank arm 26 continuously in one direction through 180° the rocker arm 30 may be rocked so as to move the damper arm 27 into open position. By rotating the crank arm 26 another 180° in the same direction the damper 27 may be again moved into the position shown. The motor 25 is supplied with power through wires 31 and 32 and may be controlled by a zone thermostat in zone A generally indicated at 33. The motor 25 may take the form disclosed in detail in the patent of R. W. Johnson No. 1,835,307. The thermostat 33 may be of the conventional bimetallic element type having a movable switch blade 34 cooperating with fixed electrical contacts 35 and 36. Contacts 35 and 36 are connected to the motor by wires 37 and 38, respectively, and the thermostat itself is connected to the motor through a manual switch arm 39 by a wire 40. The manual switch 39 may be of the form and has the function of the manual switch disclosed in the patent to Johnson above referred to. The manual switch 39 cooperates with three terminals 41, 42, and 43, the purpose of which I will describe. When the blade 34 of thermostat 33 engages with the hot contact 36 the damper motor 25 is operated to move damper 27 to the closed position as shown, this operation being the same as that described more in detail in the Johnson patent. When the thermostat 34 engages with contact 35 the damper motor 25 is operated so as to open the damper 27. By moving the manual switch arm 39 out of engagement with terminal 42 the thermostat 33 may not control the damper motor. By moving the manual swith arm 39 into engagement with terminals 41 and 43 I may manually cause the damper 27 to be moved to open or closed position, respectively.

Mounted upon an extension of the shaft of the damper motor is a cam 45 having a contour as shown comprising a raised portion and a lower portion, each portion extending over substantially 180° of cam circumference. Associated with the cam 45 so as to be operated thereby is a single pole double throw switch indicated generally at 46. The switch 46 comprises a movable switch blade 47, the end of which contacts the surface of cam 45 and the blade cooperating with fixed electrical contacts 48 and 49. When the damper 27 is in closed position as shown the cam 45 is positioned so that blade 47 engages with contact 49 and when the damper is in open position the blade 47 is raised by the cam 45 so as to engage with fixed contact 48. It will be obvious that blade 47 engages with either one or the other fixed contact dependent upon which half of the cam contour it is in contact with. Inasmuch as the equipment associated with each of zones B and C is identical with that of zone A it is not necessary that this equipment be again described. Elements of zones A and B are numbered correspondingly with those of zone A but have distinguishing letters A and B. I will trace the electrical circuits through the switches 46 when I describe the operation of my complete system.

Numeral 55 designates an additional thermostat which I employ in the summertime for summer control of my system. Thermostat 55 is of the bimetallic element type having two flexible blades 56 and 57 which engage sequentially with fixed electrical contacts 58 and 59, respectively. As will become apparent from the description of operation later my system is primarily controlled by the thermostats 33 and 55. However, I also employ a control instrument indicated generally at 60, comprising mercury switches 61 and 62 both of which may be operated by a thermostatic element 63 of the helical type responsive to the temperature within the bonnet 3. The element 63 is arranged to close the contacts of mercury switch 62 at a relatively low temperature and to open the contacts of switch 61 at a relatively high temperature.

Numeral 64 indicates generally a summer-winter switching mechanism whereby I change over the control of my apparatus for shifting from summer to winter operation and vice versa. Mechanism 64 comprises an operating handle 65, single pole single throw switches 66 and 67, and a single pole double throw switch 68, the latter switch cooperating with switch terminals 69 and 70. The summer and winter positions of the mechanisms 64 are indicated by the letters S and W on the drawing.

Numeral 71 indicates generally an electrical relay comprising a coil winding 72 which cooperates with an armature in the conventional manner to operate switch arms 73, 74, and 75. Switch arms 73 and 75 cooperate with fixed contacts 76 and 77, respectively, and switch arm 74 cooperates with fixed contacts 78 and 79. When coil 72 is deenergized the switches associated therewith take the position as shown in the drawing and when the coil is energized switches 73 and 75 close while switch arm 74 engages with fixed contact 79.

Power for my entire system may be supplied through line conductors 80 and 81 connected to a suitable external source of power (not shown) and power may be supplied to the various control instruments and devices from a voltage stepdown transformer indicated generally at 82. The transformer 82 comprises a primary winding 83 connected to conductors 80 and 81 by wires 84 and 85, respectively, and a secondary winding 86, the secondary having fewer turns than the primary.

I will now describe the complete operation of my system both during summer and winter. With the parts in the position shown the switching device 64 is positioned for winter operation. All the zone thermostats are shown in their satisfied positions so all their respective dampers are closed and therefore for reasons which will presently become apparent the burner 4 is not in operation. At this time the thermostat 55 is not in control because the fixed contacts 58 and 59 are shunted through the following circuit: from fixed contact 58 through a wire 89, switch arm 68, and fixed contact 70, wire 90 and a wire 91 leading to the fixed contact 59.

My control arrangement is such that now if any one (or more) zone thermostats should call for heat its respective damper will be open and the burner 4 will be placed in operation. Let it be assumed for purposes of illustration that thermostat 33 of zone A indicates a need for heat by its blade 34 engaging the fixed contact 35, motor 25 will now be operated so as to open the damper 27 in the manner explained in the structural description and cam 45 will be rotated so as to cause blade 47 to engage fixed contact 48 of the switch 46. Upon these upper contacts of switch 46 becoming closed an energizing circuit for the relay coil 72 is completed as follows: from switch blade 47 through a wire 92 through secondary winding 86, wire 93, relay coil 72, a portion of wire 89, switch arm 68, fixed contact 70, wire 90, and a portion of wire 91 back to fixed contact 48. Before describing the operation which ensues upon the energization of relay coil 72 I desire to point out that during winter operation coil 72 may be energized by any single zone thermostat calling for heat or by more than one zone thermostat calling for heat. I have shown how coil 72 is energized in response to thermostat 33 of zone A. For purposes of illustration let it be assumed now for example that only thermostat 33c of zone C calls for heat in the same manner as has been described in connection with thermostat 33 of zone A. Damper 27c will now be opened and blade 47c of switch 46c will engage fixed contact 48c completing an energizing circuit for relay coil 72 which is as follows: from blade 47c through a wire 93, contact 49b, blade 47b, wire 94, contact 49, blade 47, wire 92, secondary winding 86, wire 83, coil 72, a portion of wire 89, switch blade 68, wire 90, a portion of wire 91, and a wire 95 to fixed contact 48c. Thus it will be seen that if only thermostat 33c calls for heat the energizing circuit for coil 72 is completed through all the auxiliary switches 46.

Immediately upon energization of coil 72 switches 73 and 75 close and switch arm 74 moves into engagement with fixed contact 79. As soon as switch 73 closes an energizing circuit for the electric solenoid control valve 6 is completed which is as follows: from wire 92 through a wire 96, valve 6, wire 97, safety pilot 9, wire 98, mercury switch 61, wire 99, switch 73, wire 100, switch 66, and wire 101 back to the wire 93, the wires 92 and 93 connecting to the terminals of secondary winding 86 as shown. Immediately upon completion of the above described circuit valve 6 opens and fuel is supplied to the burner 4 for heating as long as at least one zone thermostat is calling for heat. As soon as the temperature within bonnet 3 rises to a predetermined value sufficiently high for heating purposes thermostatic element 63 closes mercury switch 62 completing a circuit for fan motor 15 as follows: from line conductor 80 through wire 102, switch blade 74, fixed contact 79, wire 103, mercury switch 62, wire 104, wire 105 through the motor 15 to which line conductor 81 connects. As soon as the fan begins operation heated air is forced through the air ducts to the zone or zones calling for heat. Whenever all the zone thermostats become satisfied coil 72 becomes deenergized and the switches associated therewith assume the position shown on the drawing and burner and fan operation are discontinued. It will be seen that if the pilot flame of pilot burner 7 should become extinguished the safety pilot 9 would interrupt the circuit of control valve 6 and shut down the system. Also if the bonnet temperature should reach a relatively high and unsafe value thermostatic element 63 will open mercury switch 61 also interrupting the circuit of control valve 6 and discontinuing heating. Mercury switch 61 forms a high limit switch and this switch and the safety pilot 9 are conventional devices which are ordinarily used with systems of this type and form no particular part of my invention.

I will next describe the operation of my system during summer and the manner of changing over the control devices for such operation. The switching mechanism 64 is first moved to its summer position as indicated by the letter S on the drawing thus opening switch 66, closing switch 67, and causing switch blade 68 to engage with fixed contact 69. By reason of opening of switch 66 it will be obvious that the above described circuit for control valve 6 is interrupted so that the burner 4 cannot be operated during summer. The fan motor 15 is now energized at all times when the relay coil 72 is deenergized through the following circuit: from line conductor 80 through wire 102, switch blade 74, fixed contact 78, wire 106, switch 67, and wire 105 to the motor 15 to which line conductor 81 connects. Therefore the fan 14 will now be operated whenever the relay coil 72 is deenergized for purposes of circulating air to the various zones for ventilating or cooling as may be necessary or desirable. Now as all the zone thermostats 33 are heating thermostats which are employed in the winter-time, in order to eliminate the need of reversing switches or the like or other apparatus for converting these thermostats for control over cooling, I shift control of the fan to a single thermostat 55 which I use to control the supply of air to the entire building. During summer I manually move the dampers 27 to their open position but as will presently appear I provide a unique wiring arrangement through the auxiliary switches 46 whereby the fan will not operate during the summer unless at least one damper is open thus producing an equivalent effect to that which I maintain during the winter.

When the apparatus is being prepared for summer operation by moving the switching mechanism 64 to its summer position each of the zone dampers 27 should be manually opened by moving the switch arms 39 into engagement with their respective terminals 41. This disconnects the wires 40, 40b, and 40c from the damper motors whereby the zone thermostats relinquish control and also the damper motors are operated so as to open their respective dampers. Now assuming that all the dampers or at least one of them is opened the relay coil 72 will not be energized and the fan 14 will at all times be operating to circulate air to the zone or zones having their dampers open unless the thermostat 55 has completed a circuit to energize the coil 72 as will presently appear. If it should happen that through inadvertence or for some other reason that all of the dampers are left closed in the summertime it would be of course undesirable to operate the fan and I have devised my wiring arrangement in a manner to insure against this particular exigency. Thus if all of the dampers are closed the relay will become energized to prevent fan operation through the following circuit: from secondary winding 86 through wire 92, the lower contacts of switch 46, wire 94, the lower contacts of switch 46b, wire 93, the lower contacts of switch 46c (all the switches 46 being in the position shown at this time) through a wire 107, fixed contact 69, switch blade 68, a portion of wire 89, relay coil 72, and wire 93 back to secondary winding 86. Thus if the above described circuit is completed the relay coil 72 is energized and the fan can not be operated regardless of the temperatures affecting the thermostat 55.

Now assume that all of the dampers are open as they normally should be in the summertime or that at least one of them is open; the fan 14 will be controlled by thermostat 55 in the following manner: with thermostat 55 in the position shown the temperature is above that desired in the summertime and the fan would be operating, motor 15 being energized through the switch 67. It will be noted that thermostat 55 is of the type having two contact blades and when these blades both engage their respective fixed contacts a circuit energizing relay coil 72 is completed as follows: (assuming that damper 27 of zone A is one of those open at this time) from fixed contact 59 through wire 91, fixed contact 48, blade 47, wire 92, secondary winding 86, wire 93, coil 72, and wire 89 back to fixed contact 58 of thermostat 55. Immediately upon completion of the circuit just described coil 72 is energized and the fan is stopped by reason of switch blade 74 disengaging from fixed contact 78. Simultaneously switch 75 closes completing a holding circuit for relay coil 72 which I will presently describe. First however I desire to point out that the last described circuit for coil 72 may be completed if any one or more of the zone dampers are open. The circuit at last described above energizes the coil 72 if the zone damper 27 of zone A is open. Assuming now that only the zone damper 27c is open; thermostat 55 may now energize coil 72 through the following circuit: from fixed contact 59 through wire 91, wire 95, contact 48c, blade 47c, wire 93, the lower contacts of switch 46b, wire 94, the lower contacts of switch 46 (dampers 27 and 27b being closed as assumed), wire 92, secondary winding 86, wire 93, coil 72, and wire 89 back to fixed contact 58.

Referring now to the holding circuit which I referred to above this circuit becomes complete whenever the thermostat 55 energizes coil 72 closing switch 75 as follows: from thermostat 55 through wire 108, switch 75, a portion of wire 89, coil 72, wire 93, secondary winding 86, wire 92, the upper contacts of switch 46 (assuming for the moment that damper 27 is open), wire 91 back to fixed contact 59. If damper 27 of zone A is closed and damper 27b open for example, the holding circuit would be completed in the manner above described to wire 92 and then through the lower contacts of switch 46 through wire 94, the upper contacts of switch 46b, wire 109 to wire 91 and back to fixed contact 59. It will be apparent from the above described holding circuits that when the coil 72 has been energized by thermostat 55 it will remain energized as long as blade 57 engages fixed contact 59, that is, both blades of thermostat 55 must engage their respective contacts to energize the relay but the relay will remain energized until blade 57 disengages from its fixed contact. With this particular type of thermostat blade 57 engages its associated contact first and the blade 56 engages its contact later at a slightly lower temperature in this particular instance. Obviously therefore the contacting arrangement of the thermostat provides a differential and by reason of the holding circuit becoming established at the instant the relay is energized there is no fluttering of the relay inasmuch as blade 57 is firmly engaged with contact 59 in the holding circuit at the time the relay is energized. This particular type of thermostat and its operation are well known in the art and the thermostat itself forms no particular part of my invention.

From the foregoing it will be apparent that I have provided an unusual system whereby during the winter-time I have complete zone control of heating with each damper responding to its respective thermostat and in summer a single thermostat is in sole control. While I use only a single thermostat for control in the summertime I retain the desirable effect characteristic of the zone control that at least one damper must be open in order for the fan to be operating. As will be appreciated, a single thermostat will satisfactorily control fan operation for cooling or ventilating in the summertime and by my arrangement I eliminate the apparatus which would be necessary to provide for complete zone operation in summer as well as in winter. However, as I have clearly described I utilize the auxiliary switches of the equipment in cooperation with the summer thermostat even though I do not convert the zone thermostats for summer use by providing means for reversing their electrical connections or the like. All the elements of my system are of standard type and are of a simple and inexpensive nature whereby I have provided an all year air conditioning control arrangement the cost of which will be brought within the range of the ordinary home owner or residence dweller.

I am aware that various changes may be made in the single embodiment of my invention which I have disclosed and all those changes which might occur to or be made by those skilled in the art are intended to fall within the spirit and scope of the invention. I am therefore to be limited only as determined by the appended claims.

I claim as my invention:

1. In an air conditioning system having a plurality of zones, in combination, air treating apparatus, means including a fan for circulating air to said zones, individual zone thermostats and dampers controlled thereby for regulating the temperature in respective zones, electrical control apparatus comprising a relay means controlling the fan, an auxiliary switch associated with each damper, each auxiliary switch being operable to energize said relay means for starting the fan, a summer-winter changeover switch operable for summer operation to influence the control apparatus so that all the said auxiliary switches must cooperate for energizing the relay, and said summer-winter switch being cooperably arranged with the relay means whereby during summer operation the fan is started when the relay is deenergized.

2. In an air conditioning system in combination, a plurality of zones each having a zone thermostat and a damper controlled thereby, air treating means, and a fan for circulating air to the zones, a switching means operably associated with each damper and a relay controlled thereby for regulating fan operation, said relay having contacts controlling a fan circuit both when the relay is energized and deenergized, control means comprising a summer thermostat and a summer-winter switching mechanism having one position in summer and a second position in winter, each said switching means being operable to energize said relay in winter, and said summer thermostat being operable to energize said relay in summer, and all said switching means being cooperably effective to energize said relay in summer if all dampers are closed, said relay starting said fan when deenergized in summer and controlling the starting of the fan when energized in winter.

3. In a temperature regulating installation, in combination, a fluid distributing system comprising a fluid circulating device, control apparatus comprising a relay governing the operation of said fluid circulating device, said relay being operable to interrupt operation of the fluid circulating device either upon being energized or upon being deenergized, fluid flow controlling devices located at a plurality of points of delivery of fluid by said system and controlling switches operably associated with each device, a summer-winter switch having a summer position and a winter position for determining whether said relay interrupts operation of the fluid circulating device upon becoming energized or upon becoming deenergized, each of said controlling switches being operable to energize said relay when said summer-winter switch is in its winter position, operation of said fluid circulating device ceasing upon deenergization of the relay in the wintertime, said relay causing termination of operation of the fluid circulating device upon being energized when the summer-winter switch is in its summer position, said controlling switches assuming positions completing a circuit extending through all of them for energizing the relay in summertime if all said fluid flow controlling devices are in flow obstructing position, and a thermostat operable to energize said relay when the summer-winter switch is in summer position.

4. In a temperature regulating installation, in combination, a fluid distributing system comprising a fluid circulating device, control apparatus comprising a relay governing the operation of said fluid circulating device, fluid flow controlling devices located at a plurality of points of delivery of fluid by said system and controlling switches operably associated with each device, a summer-winter switch having a summer position and a winter position, each of said controlling switches being operable to control said relay when said summer-winter switch is in its winter position, a thermostat operable to control said relay when said summer-winter switch is in its summer position, and means for interlocking said controlling switches and said relay to prevent operation of said circulating device when all said flow controlling devices are closed.

5. In a temperature regulating installation, in combination, a fluid distributing system comprising a fluid circulating device, control apparatus comprising a relay governing the operation of said fluid circulating device, said relay being operable to open an electrical circuit through the fluid circulating device either upon being energized or upon being deenergized, controlling switches located in the vicinity of a plurality of points of delivery of fluid by said system, a summer-winter switch having a summer position and a winter position cooperably associated with said relay and controlling switches, each of said controlling switches being operable to energize said relay when said summer-winter switch is in its winter position, said relay being energizable by a circuit extending through all said controlling switches when said summer-winter switch is in its summer position, and a thermostat operable to energize said relay when said summer-winter switch is in its summer position through a circuit which may extend through any one of said controlling switches.

6. In a temperature regulating installation, in combination, a fluid distributing system comprising fluid heating equipment and a fluid circulating device, control apparatus comprising a relay governing the operation of said heating equipment and fluid circulating device, fluid flow controlling devices located at a plurality of points of delivery of fluid by said system and controlling switches operably associated with each device, a summer-winter switch means having a summer position and a winter position, each of said controlling switches being operable to control said relay when said summer-winter switch means is in its winter position, control of said heating equipment by said relay terminating when said summer-winter switch is in its summer position, a thermostat operable to control said relay when said summer-winter switch is in its summer position, and means for interlocking said controlling switches and said relay to prevent operation of said circulating device when all said flow controling devices are closed.

7. In a temperature regulating system, in combination, an enclosure having a plurality of zones, fluid heating equipment and means for circulating fluid to the zones, a relay controlling the heating equipment and circulating means, a summer-winter switching means having summer and winter positions, said relay having an out contact controlling the circulating means when the summer-winter switching means is in its summer position, temperature responsive fluid flow controlling devices associated with each zone, an auxiliary switch associated with each controlling device, each said auxiliary switch being operable to control said relay when said summer-winter switch is in its winter position, all said auxiliary switches cooperating to energize said relay if all the fluid flow controlling devices are in flow obstructing position when the summer-winter switch is in summer position, and a summer thermostat operable to energize and deenergize said relay for controlling the fluid circulating means in the summer time.

8. In a temperature regulating system, in combination, an enclosure having a plurality of zones, fluid heating means and means for circulating fluid to the zones, control apparatus comprising individual temperature responsive zone flow control devices, a summer-winter switch having summer and winter positions, each said temperature responsive device being operable to control the heating means and fluid circulating means when the summer-winter switch is in its winter position, means for positioning said flow control devices in open position for summer operation, a summer thermostat for controlling the circulating means independently of the heating means when the summer-winter switch is in the summer position, and said control apparatus embodying means arranged so that if all the flow control devices are in closed position when the summer-winter switch is in summer position the circulating means cannot be operated.

9. In a temperature regulating system, in combination, an enclosure having a plurality of zones, fluid heating means and means for circulating fluid to the zones, control apparatus comprising individual temperature responsive zone flow control devices, a relay governing operation of said fluid circulating means, said relay being capable of interrupting operation of said fluid circulating means either upon being energized or upon being deenergized, a summer-winter switch means having summer and winter positions for determining whether said relay interrupts operation of said fluid circulating means upon being energized or upon being deenergized, each of said temperature responsive devices being operable to control said relay when said summer-winter switch is in the winter position, said control apparatus embodying means so arranged that if all said flow controlling devices are in flow obstructing position when the summer-winter switch is in summer position the relay becomes energized, and a summer thermostat for controlling operation of the fluid circulating means independently of the fluid heating means when the summer-winter switch is in summer position.

10. In a temperature regulating system, in combination, a fluid distributing system comprising a fluid circulating device, control apparatus comprising a relay governing the operation thereof, fluid flow controlling devices located at a plurality of points of delivery of fluid by said system and controlling switches operably associated with each device, a summer-winter switch means having a summer and a winter position whereby starting of said circulating device may result from said relay being in its energized or deenergized position, each of said controlling switches individually controlling said relay when said summer-winter switch is in its winter position, said relay governing starting of the circulating means when the relay is in one of its positions in winter, said summer-winter switch means controlling circuits whereby when in its summer position starting of said circulating device is governed by said relay being in its other position and whereby if all said fluid flow controlling devices are in flow obstructing position said controlling switches assume positions wherein said relay assumes its said one position preventing operation of said circulating device.

11. In a temperature regulating system, in combination, a fluid distributing system comprising a fluid circulating device, control apparatus comprising a relay governing the operation thereof, fluid flow controlling devices located at a plurality of points of delivery of fluid by said system and controlling switches operably associated with each device, a summer-winter switch means having a summer and a winter position whereby starting of said circulating device may result from said relay being in its energized or deenergized position, each of said controlling switches individually controlling said relay when said summer-winter switch is in its winter position, said relay governing starting of the circulating means when the relay is in one of its positions in winter, said summer-winter switch means controlling circuits whereby when in its summer position starting of said circulating device is governed by said relay being in its other position and whereby if all said fluid flow controlling devices are in flow obstructing position said controlling switches assume positions wherein said relay assumes its said one position preventing operation of said circulating device, and a thermostat cooperating with said relay and summer-winter switch means whereby said thermostat controls said relay in summer time.

12. In an air conditioning system of the zone type, in combination, a plurality of zones having individual zone thermostats and dampers controlled thereby, air treating means and a fan for circulating air from said means to the various zones, an auxiliary switch operably associated with each damper for individually controlling the fan, a summer-winter changeover switching arrangement and a separate summer thermostat, said switching arrangement being operable to relieve the zone thermostats of individual control and shift control to said separate thermostat for summer operation, and said auxiliary switches cooperating with said switching arrangement in a manner whereby at least one of said dampers must be in open position in order for said fan to be operated.

13. In an air conditioning system of the zone type, in combination, air treating apparatus and means including a fan for circulating air to a plurality of zones, individual zone thermostats and dampers controlled thereby for regulating the temperature in respective zones, control means associated with the dampers and comprising a summer-winter switching mechanism having summer and winter positions, said control means rendering the fan energizable in response to each of said thermostats when the said mechanism is in its winter position, said control means including a master thermostat for controlling the fan if any damper is open when the said mechanism is in its summer position, said control means preventing operation of the fan when all dampers are closed.

14. In an air conditioning system for a plurality of zones, in combination, conduit means for delivering a temperature changing medium to said zones, means for forcing circulation of said medium through said conduit means, damper means for controlling the delivery of said medium to each zone, control means associated with each zone for positioning the respective zone damper means, separate control means for controlling the operation of said circulation forcing means, switch means responsive to the position of each said damper means, and means for interlocking all said switch means and said last-mentioned control means to prevent operation of said circulation forcing means when all said damper means are closed.

CLARENCE W. NESSELL.